US008374357B2

(12) United States Patent
Nakagawa

(10) Patent No.: US 8,374,357 B2
(45) Date of Patent: Feb. 12, 2013

(54) AUDIO OUTPUT DEVICE

(75) Inventor: Tooru Nakagawa, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 83 days.

(21) Appl. No.: 12/844,605

(22) Filed: Jul. 27, 2010

(65) Prior Publication Data

US 2011/0026728 A1 Feb. 3, 2011

(30) Foreign Application Priority Data

Jul. 30, 2009 (JP) ................................. 2009-177781

(51) Int. Cl.
*H04B 3/00* (2006.01)

(52) U.S. Cl. .................. 381/81; 381/1; 381/17; 381/18; 381/27; 381/300; 381/301; 381/304; 381/306; 381/333; 381/386; 381/388

(58) Field of Classification Search .................... 381/81, 381/300, 28, 1, 17, 18, 19, 27, 301, 304, 381/306, 307, 332, 386, 388, 395
See application file for complete search history.

(56) References Cited

U.S. PATENT DOCUMENTS

| | | | |
|---|---|---|---|
| 6,381,335 | B2 | 4/2002 | Juszkiewicz et al. |
| 7,813,824 | B2 | 10/2010 | Takahama |
| 2001/0053231 | A1 | 12/2001 | Juszkiewicz et al. |
| 2002/0131611 | A1 | 9/2002 | Hoover et al. |
| 2005/0157889 | A1* | 7/2005 | Yonezu ........................... 381/77 |
| 2007/0077020 | A1 | 4/2007 | Takahama |
| 2008/0080730 | A1* | 4/2008 | Takakusaki ................... 381/300 |
| 2011/0026717 | A1 | 2/2011 | Nakagawa |

FOREIGN PATENT DOCUMENTS

| | | |
|---|---|---|
| JP | 6-085772 | 3/1994 |
| JP | 2001-084079 | 3/2001 |
| JP | 2001-309499 | 11/2001 |
| JP | 2003-009279 | 1/2003 |
| JP | 2003-518345 | 6/2003 |
| JP | 2004-023512 | 1/2004 |
| JP | 2004-363952 | 12/2004 |
| JP | 2006-311070 | 11/2006 |
| JP | 2006-339852 | 12/2006 |
| JP | 2007-060367 | 3/2007 |
| JP | 2007060367 A * | 3/2007 |
| JP | 2007-088774 | 4/2007 |
| JP | 2008-085803 | 4/2008 |
| JP | 2008-085902 | 4/2008 |
| JP | 2008-109382 | 5/2008 |

(Continued)

OTHER PUBLICATIONS

Japanese Patent Application No. 2009-177781; Notification of Reasons for Refusal; mailed Sep. 21, 2010. (English translation).
Japanese Patent Application No. 2009177780; Notification of Reasons for refusal; Mailed Oct. 12, 2010 (with English Translation).
U.S. Appl. No. 12/844,619; Non-Final Office Action; Mailed Aug. 30, 2011.

*Primary Examiner* — Vivian Chin
*Assistant Examiner* — Paul Kim
(74) *Attorney, Agent, or Firm* — Blakely, Sokoloff, Taylor & Zafman LLP

(57) ABSTRACT

An audio output device includes: a main unit including a terminal configured to connect an external speaker; a speaker unit configured to be detachably attached to the main unit while the terminal is covered with the speaker unit; and an amplification unit configured to amplify an audio signal so that the amplified audio signal is input to the terminal and the speaker unit.

7 Claims, 8 Drawing Sheets

FOREIGN PATENT DOCUMENTS

| | | |
|---|---|---|
| JP | 2008-154084 | 7/2008 |
| JP | 2009-055450 | 3/2009 |
| JP | 2009-089425 | 4/2009 |
| JP | 2009-105479 | 5/2009 |

* cited by examiner

AUDIO OUTPUT DEVICE

CROSS-REFERENCE TO RELATED APPLICATIONS

This application is based upon and claims the benefit of priority from Japanese Patent Application No. 2009-177781, filed Jul. 30, 2009, the entire contents of which are incorporated herein by reference.

BACKGROUND

1. Field

One embodiment of the invention relates to an audio output device provided with connection terminals for external speakers.

2. Description of the Related Art

As an audio output device according to the related art, there is an audio output device which has a stand for supporting a display unit displaying video and in which speakers are disposed in the inside of the stand. It is disclosed by, for example, JP-T-2003-518345.

Use of external speakers is however unconsidered in the audio output device according to the related art. For this reason, an amplifier for external speakers is required additionally when external speakers are connected for outputting audio.

BRIEF DESCRIPTION OF THE DRAWINGS

A general configuration that implements the various feature of the invention will be described with reference to the drawings. The drawings and the associated descriptions are provided to illustrate embodiments of the invention and not to limit the scope of the invention.

DETAILED DESCRIPTION OF THE EMBODIMENTS

An embodiment of the invention will be described below in detail with reference to the drawings.

Figure 1A:
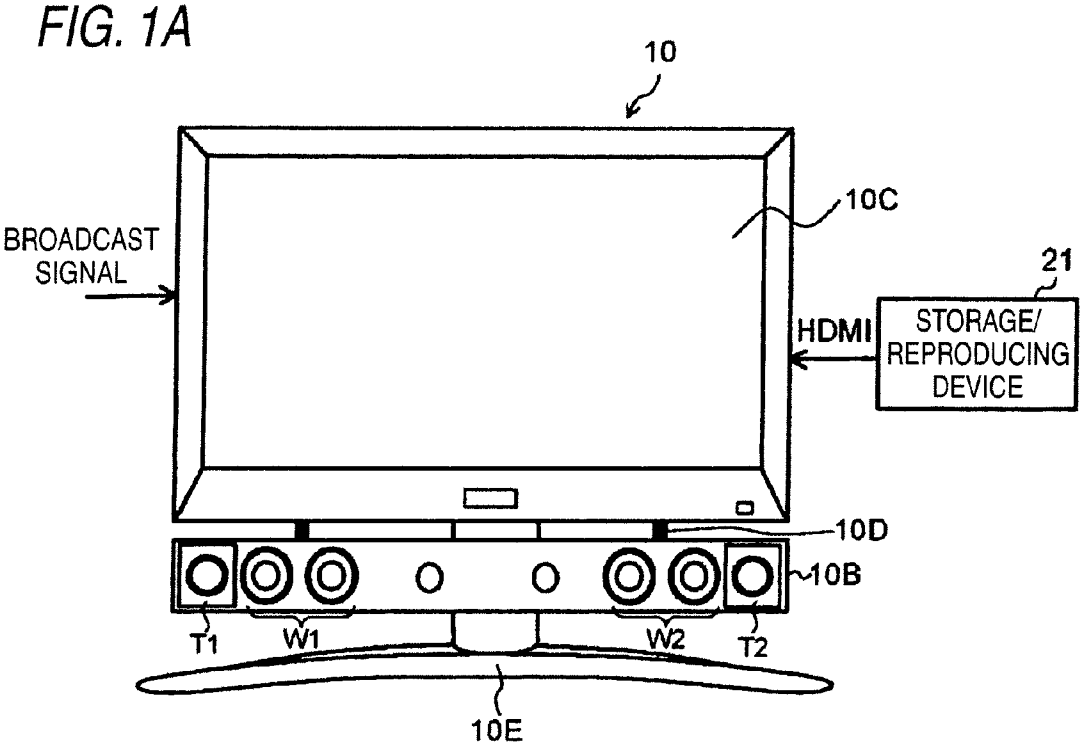
FIG. 1A is an exemplary front view of an audio output device according to a first embodiment in a connection mode.
Figure 1B:
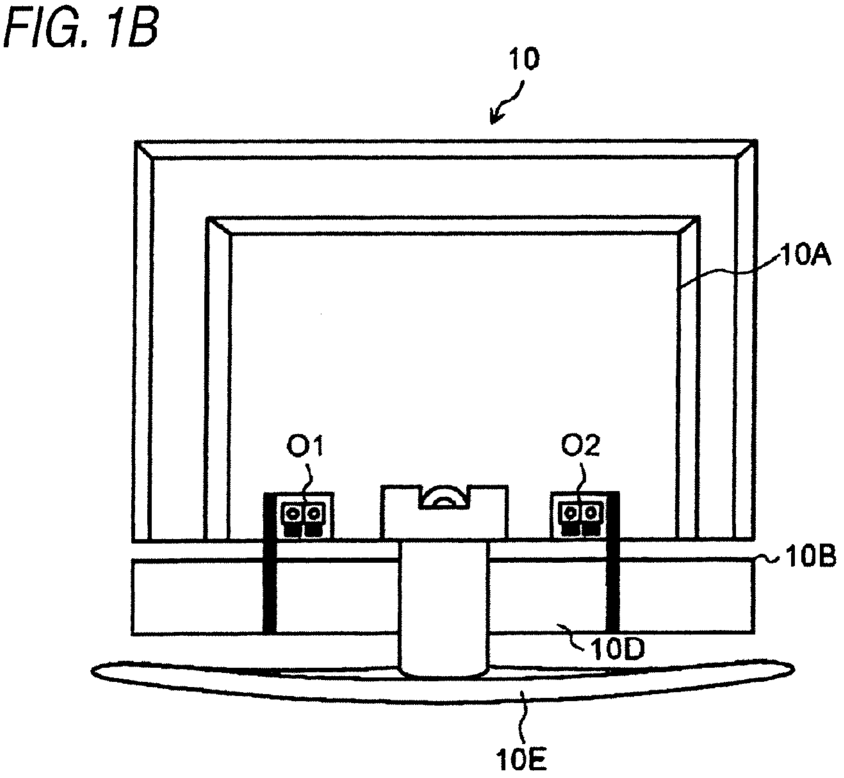
FIG. 1B is a back view of the audio output device according to the first embodiment in the connection mode.
Figure 2A:
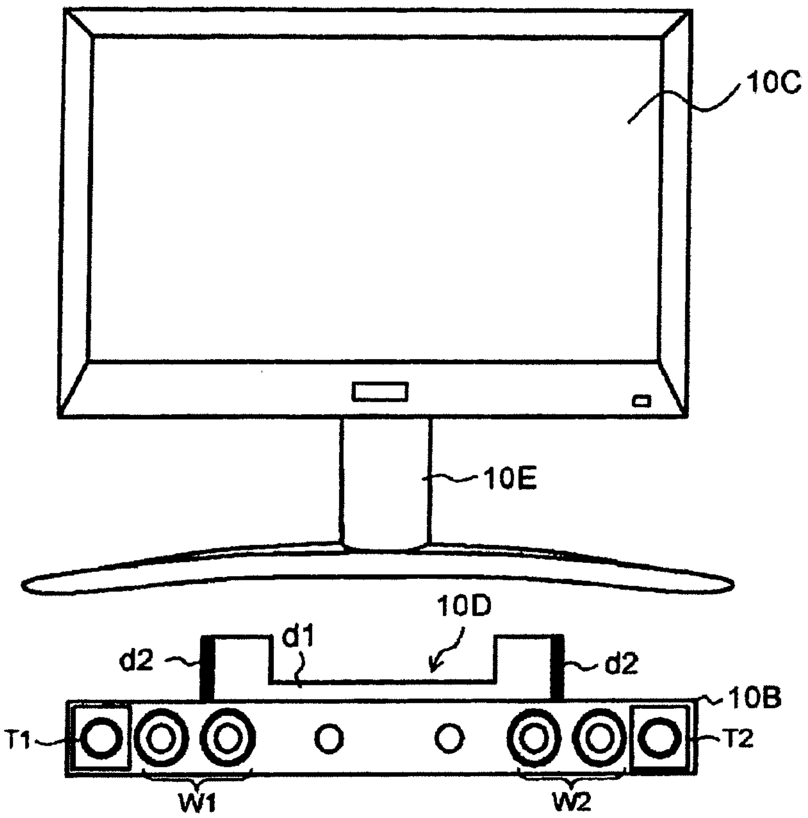
FIG. 2A is an exemplary front view of the audio output device according to the first embodiment in a disconnection mode.
Figure 2B:
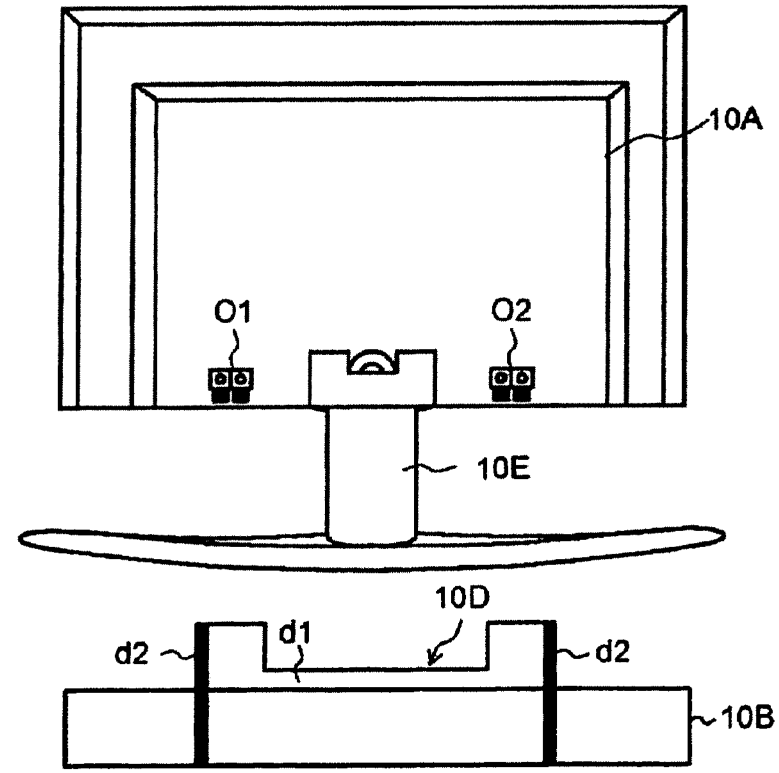
FIG. 2B is an exemplary back view of the audio output device according to the first embodiment in the disconnection mode.

FIGS. 1A and 1B are an exemplary front view and an exemplary back view of an audio output device 10 according to a first embodiment, respectively in a connection mode. FIGS. 2A and 2B are an exemplary front view and an exemplary back view of the audio output device 10 according to the first embodiment, respectively in a disconnection mode.

The audio output device 10 includes a Set Top Box (STB) 10A, a speaker unit 10B, a display unit 10C, and a stand 10E. The STB 10A generates a video signal and an audio signal by decoding a broadcast signal of a broadcast station etc. input through an antenna not shown. The STB 10A feeds the generated video and audio signals or video and audio signals input from an external storage/reproducing device (inclusive of a reproducing device) 21 to the speaker unit 10B and the display unit 10C. The STB 10A has terminals (connection terminals) O1 and O2 to which external speakers are connected when the external speakers are used.

The speaker unit 10B is provided as a two-way speaker system having woofers W1 and W2 (bass speakers) and tweeters T1 and T2 (treble speakers) for reproducing stereo audio. A combination of the woofer W1 and the tweeter T1 and a combination of the woofer W2 and the tweeter T2 are disposed on left and right sides of an integrally formed speaker box, respectively. The woofers W1 and W2 and the tweeters T1 and T2 of the speaker unit 10B output audio based on an audio signal (such as a stereo audio signal or a monaural audio signal) input from the STB 10A.

The speaker unit 10B has a connection member 10D by which the speaker unit 10B is detachably attached to a main unit (the STB 10A and the display unit 10C) while the terminals O1 and O2 are covered with the connection member 10D. The connection member 10D has a transparent acrylic plate d1, and two thin metal stays d2. The transparent acrylic plate d1 and the two thin metal stays d2 are used in combination for connecting the speaker unit 10B to the STB 10A. In this manner, the speaker unit 10B looks floating out of the main unit (the STB 10A and the display unit 10C). In addition, the speaker unit 10B is formed as a strong structure.

When the speaker unit 10B is connected to the STB 10A (when the speaker unit 10B is used), it is impossible to connect external speakers because the terminals O1 and O2 are covered with the connection member 10D. When the speaker unit 10B is not connected to the STB 10A (when the speaker unit 10B is not used), it is possible to connect external speakers because the terminals O1 and O2 are exposed.

The STB 10A and the speaker unit 10B are connected by a connector, so that an audio signal is transmitted from the STB 10A to the woofers W1 and W2 and the tweeters T1 and 12 of the speaker unit 10B. In addition, when the connector is attached, a wiring for detecting connection of the speaker unit 10B is connected to a wiring grounded in the inside of the speaker unit 10B so that connection of the speaker unit 10B can be detected. Incidentally, a wiring for transmitting an audio signal and the wiring for detecting connection of the speaker unit 10B pass through the inside of the metal stays d2 so as to be connected to the STB 10A. Thus, wiring materials can be wired neatly.

The display unit 10C displays video based on a video signal input from the STB 10A. The stand 10E supports the STB 10A, the speaker unit 10B and the display unit 10C.

The storage/reproducing device 21 is a Digital Versatile Disk (DVD) player or recorder, a Hard Disk Drive (HDD) recorder, etc. for storing/reproducing contents. The storage/reproducing device 21 is connected to the audio output device 10 by an HDMI, an analog connection means or the like. The storage/reproducing device 21 inputs a video signal, an audio signal and a control signal of contents (e.g. movie, Promotion Video (PV), etc.) to be reproduced, to the audio output device 10. In the HDMI, wiring can be simplified because a video signal cable, an audio signal cable and a control signal cable are integrated into one cable.

Figure 3:
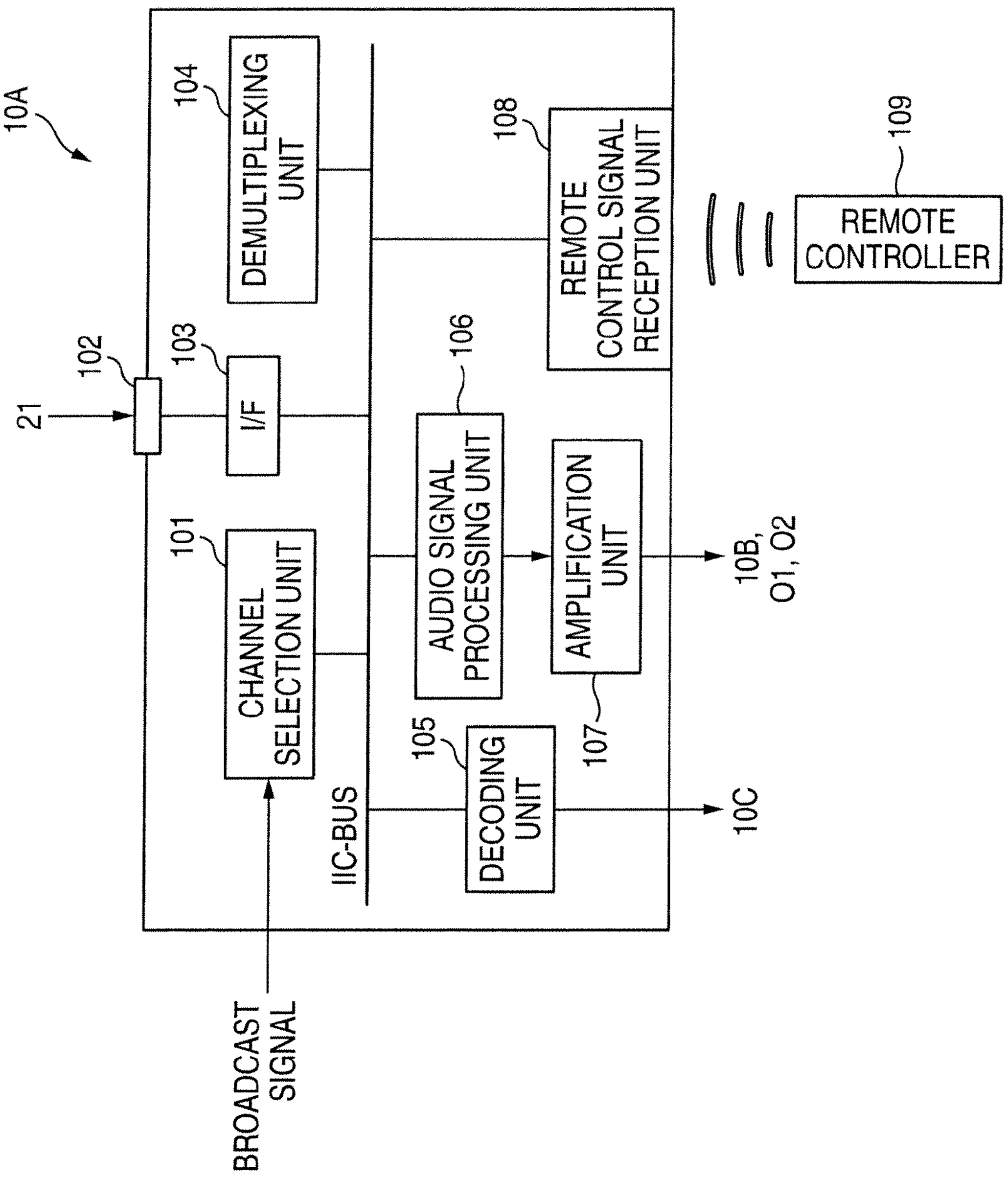
FIG. 3 is an exemplary diagram showing the configuration of an STB.

FIG. 3 is an exemplary diagram showing the configuration of the STB 10A. The STB 10A includes a channel selection unit 101, a terminal 102, an I/F 103, a demultiplexing unit 104, a decoding unit 105, an audio signal processing unit 106, an amplification unit 107, and a remote control signal reception unit 108.

The channel selection unit 101 selects a desired channel from a broadcast signal received via an antenna. The channel selection unit 101 generates a Transport Stream (TS) by demodulating the broadcast signal of the selected channel.

The terminal 102 is an HDMI terminal, an analog input terminal or the like for connecting the storage/reproducing device 21. The Interface (I/F) 103 is an interface for receiving/transmitting data from/to the storage/reproducing device 21 connected to the terminal 102 or receiving a video/audio signal from the storage/reproducing device 21.

The demultiplexing unit 104 demultiplexes a broadcast signal, SI/PSI, etc. from the TS generated by the channel selection unit 101. The TS is a multiplexed signal including a broadcast signal and SI/PSI. For example, the broadcast signal is an MPEG-2 broadcast signal. The broadcast signal contains an Audio Elementary Stream (audio ES) and a Video Elementary Stream (video ES) which are provided as coded audio and video respectively. The PSI is information for specifying programs present in the TS and specifying ESs contained in the TS and belonging to the programs respectively. The SI contains Electronic Program Guide (EPG) information.

The decoding unit 105 generates an audio signal and a video signal by decoding the audio and video ESs demultiplexed by the demultiplexing unit 104. The generated audio signal is input to the audio signal processing unit 106. The generated video signal is input to the display unit 10C. The display unit 10C displays video based on the video signal input from the decoding unit 105 or the video signal input from the storage/reproducing device 21 through the terminal 102.

The audio signal processing unit 106 is composed of a circuit such as a Digital Signal Processor (DSP). The audio signal processing unit 106 processes the audio signal input from the decoding unit 105 or from the storage/reproducing device 21 through the terminal 102, and outputs the processed audio signal to the tweeters T1 and T2 and the woofers W1 and W2 of the speaker unit 10B and the terminals O1 and O2 of the STB 10A. The amplification unit 107 amplifies the audio signal input from the audio signal processing unit 106.

Figure 4:
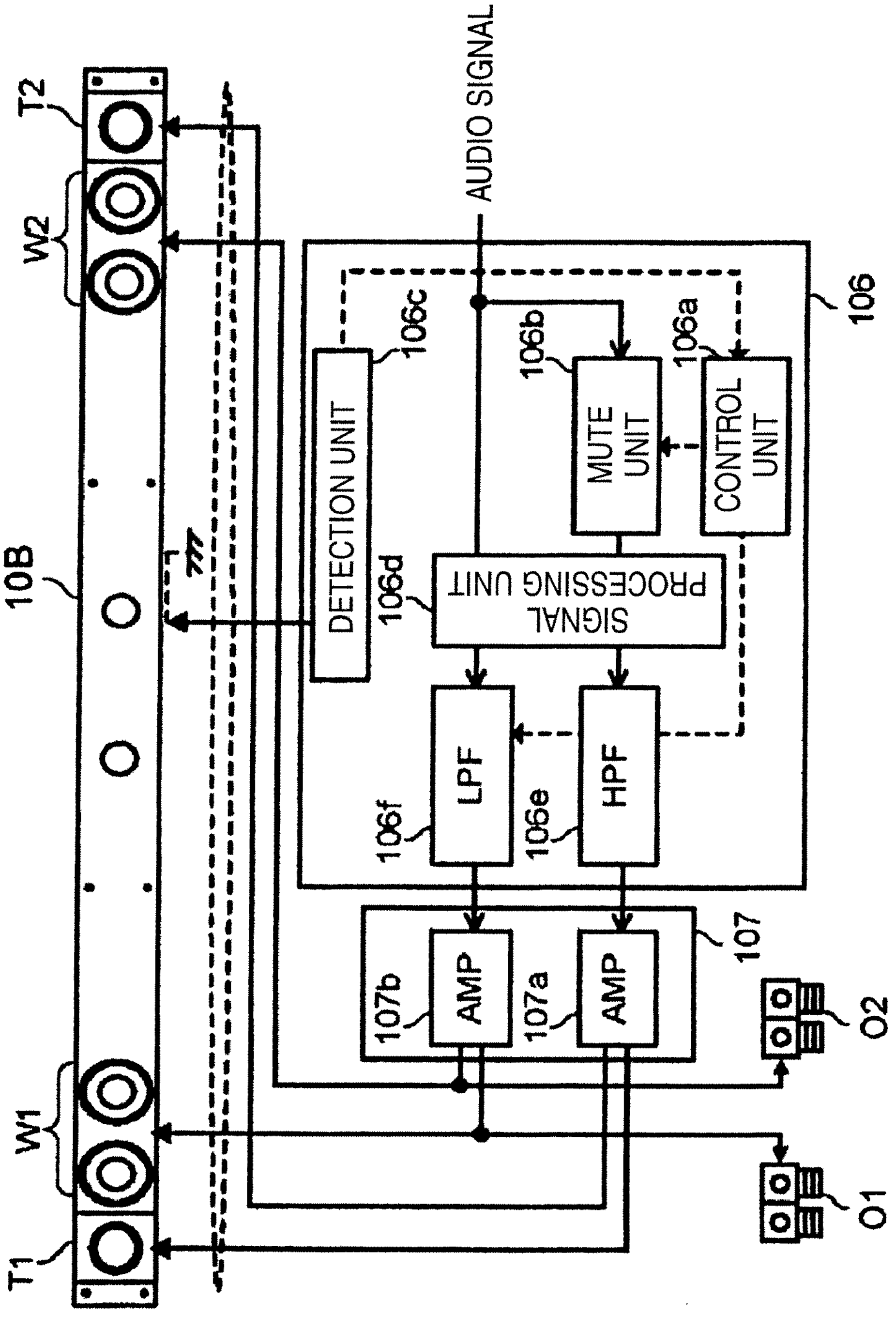
FIG. 4 is an exemplary diagram showing the configuration of an audio signal processing system according to the first embodiment.

FIG. 4 is an exemplary diagram showing the configuration of an audio signal processing system according to the first embodiment. The audio signal processing unit 106 includes a control unit 106*a*, a mute unit 106*b*, a detection unit 106*c*, a signal processing unit 106*d*, a High Pass Filter (HPF) 106*e*, and a Low Pass Filter (LPF) 106*f*. The amplification unit 107 includes amplifiers (AMPs) 107*a* and 107*b*.

The audio signal input to the audio signal processing unit 106 is separated into two systems for woofer use and tweeter use. The separated audio signals are subjected to processing by the signal processing unit 106*d*, the HPF 106*e* and the LPF 106*f* and amplified by the AMPs 107*a* and 107*b* of the amplification unit 107. Then, the separated audio signals are input to the speaker unit 10B and the terminals O1 and O2.

The configuration of the audio signal processing unit 106 and the amplification unit 107 will be described below in detail.

The mute unit 106*b* mutes an input audio signal in accordance with an instruction given from the control unit 106*a*. That is, the mute unit 106*b* stops output of the audio signal to the HPF 106*e* in the subsequent stage. The signal processing unit 106*d* processes the input audio signal. Specifically, the signal processing unit 106*d* performs processing such as sound volume control, sound quality setting (amplification/attenuation of bass/treble) and surround processing.

The HPF 106*e* passes a treble component (high frequency component) of the audio signal fed from the signal processing unit 106*d* so that the treble component of the audio signal is input to the AMP 107*a*. The LPF 106*f* passes a bass component (low frequency component) of the audio signal fed from the signal processing unit 106*d* so that the bass component of the audio signal is input to the AMP 107*b*. The AMP 107*a* amplifies the audio signal fed from the HPF 106*e* so that the amplified audio signal is input to the tweeters T1 and T2. The AMP 107*b* amplifies the audio signal fed from the LPF 106*f* so that the amplified audio signal is input to the woofers W1 and W2 and the terminals O1 and O2.

Each of the HPF 106*e* and the LPF 106*f* is an Finite Impulse Response (FIR) type filter which can achieve such linear phase (constant delay) characteristic that could not but be achieved approximately by an analog filter. The linear phase is such characteristic that phase characteristic is linear with respect to any frequency. That is, because all frequency components are delayed for a constant time, a faithful waveform can be reproduced without any disturbance of the waveform. Accordingly, system adjustment can be made without taking phase delay into consideration in the filtering process. Results of comparison between the FIR type filter and the analog filter will be described later with reference to FIGS. 7A to 8C.

The detection unit 106*c* detects whether the speaker unit 10B is connected or not. A wiring for detecting connection of the speaker unit 10B is connected to the detection unit 106*c*. The detection unit 106*c* applies a constant voltage to the wiring to thereby detect the electric potential of the wiring. When the speaker unit 10B is connected, that is, when the STB 10A and the speaker unit 10B are connected by a connector, the electric potential of the wiring changes (descends) because one end of the wiring for detecting connection of the speaker unit 10B is grounded. The detection unit 106*c* detects the change in the electric potential of the wiring to thereby detect whether the speaker unit 10B is connected or not.

The control unit 106*a* controls the mute unit 106*b* and the LPF 106*f* in accordance with whether the speaker unit 10B is connected or not. Whether the speaker unit 10B is connected or not is recognized based on a detection signal given from the detection unit 106*c*. Incidentally, configuration may be made so that the connection state of the speaker unit 10B can be set (stored) by a remote controller 109 (which will be described later), and that whether the speaker unit 10B is connected or not can be confirmed based on the content of the setting (storage).

When the speaker unit 10B is not connected, it is necessary to output audio from external speakers. For this reason, the control unit 106*a* controls the mute unit 106*b* to stop (mute)

output of an audio signal. In addition, the control unit 106*a* turns off a filter function of the LPF 106*f* so that an audio signal is bypassed, i.e. an input audio signal is input directly to the AMP 107*b*. By the aforementioned control, audio which has not been subjected to the filtering process is output from the external speakers connected to the terminals O1 and O2.

Incidentally, when the speaker unit 10B is not connected, the mute unit 106*b* may be dispensed with because audio is never output from the speaker unit 10B. The provision of the mute unit 106*b* can however suppress radiation of unnecessary noise from the connector for connecting the STB 10A and the speaker unit 10B or from the wiring. Even when the operation of the AMP 107*a* is controlled by the control unit 106*a* (the AMP 107*a* is turned off), the same effect as described above can be obtained.

When the speaker unit 10B is connected, it is necessary to output audio from the speaker unit 10B. Therefore, the control unit 106*a* controls the mute unit 106*b* to demute an audio signal. In addition, the control unit 106*a* controls the LPF 106*f* to pass a bass component of an audio signal input from the signal processing unit 106*d*. By the aforementioned control, the bass component of the audio signal is output from the woofers W1 and W2 while a treble component of the audio signal is output from the tweeters T1 and T2. Incidentally, when the speaker unit 10B is connected, it is impossible to connect external speakers because the terminals O1 and O2 are covered with the connection member 10D. Accordingly, audio is never output from the external speakers.

The remote control signal reception unit 108 receives a remote control signal which is transmitted from a remote controller 109 by radio such as infrared rays. The remote controller 109 is provided with various keys necessary for operating the audio output device 10, such as a "select" key, a "decide" key, etc. A user can operate the storage/reproducing device 21 or can set connection/disconnection of external speakers by using the remote controller 109.

Figure 5:
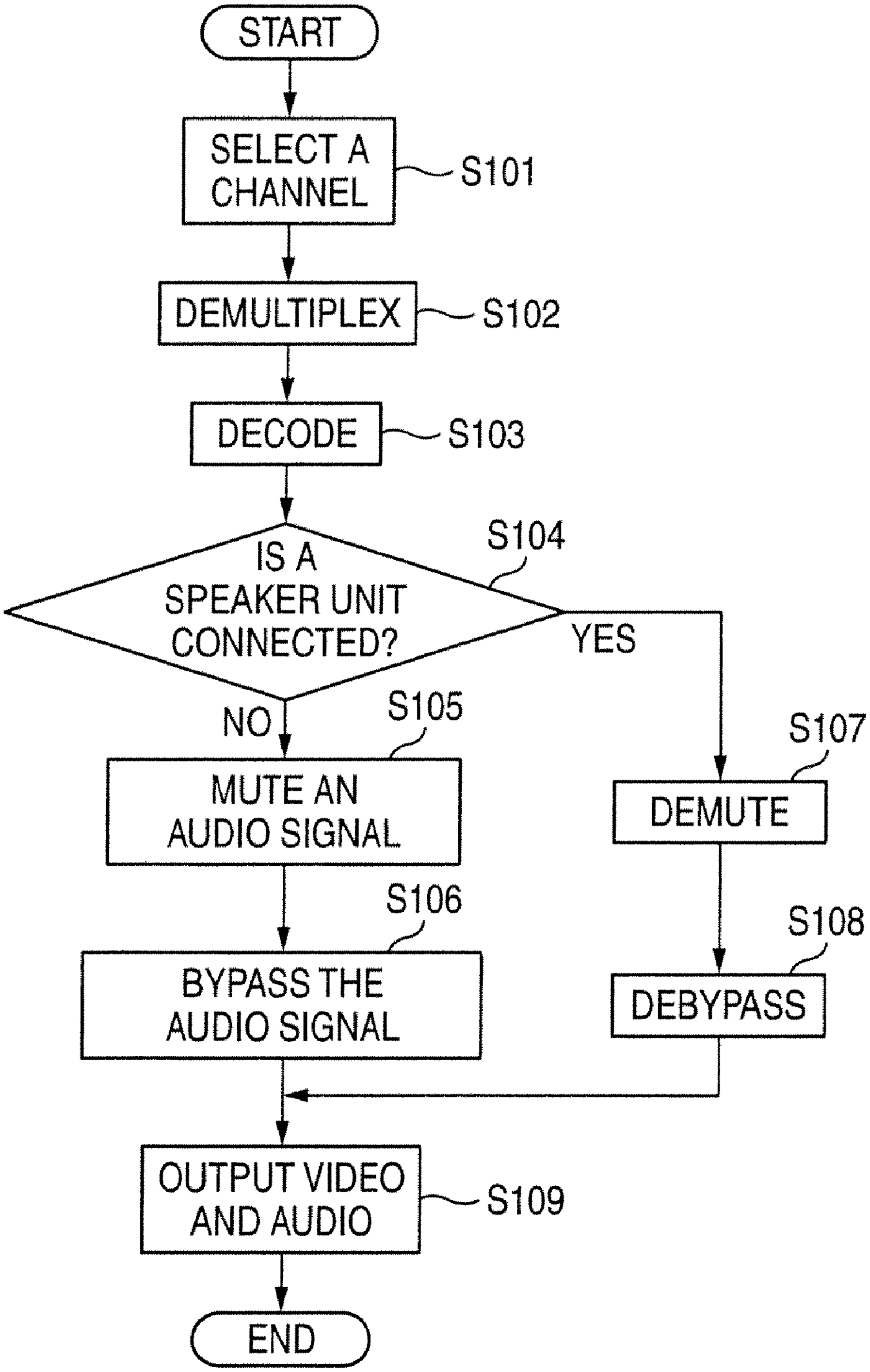
FIG. 5 is an exemplary flow chart showing the operation of the audio output device according to the first embodiment.

Next, the operation of the audio output device 10 according to the first embodiment will be described. FIG. 5 is an exemplary flow chart showing the operation of the audio output device 10 according to the first embodiment. The channel selection unit 101 selects a desired channel from a broadcast signal received via the antenna (Step S101). The channel selection unit 101 generates a Transport Stream (TS) by demodulating the broadcast signal of the selected channel.

The demultiplexing unit 104 demultiplexes a broadcast signal, PI/PSI, etc. from the TS generated by the channel selection unit 101 (Step S102). The decoding unit 105 generates an audio signal and a video signal by decoding an audio ES and a video ES demultiplexed by the demultiplexing unit 104 (Step S103). The demultiplexing unit 104 inputs the generated audio signal to the audio signal processing unit 106. The demultiplexing unit 104 further inputs the generated video signal to the display unit 10C.

The control unit 106*a* of the audio signal processing unit 106 determines whether the speaker unit 10B is connected or not (Step S104). When the speaker unit 10B is not connected (No in Step S104), the control unit 106*a* controls the mute unit 106*b* to stop (mute) output of the audio signal (Step S105). In addition, the control unit 106*a* turns off (bypasses) a filter function of the LPF 106*f* (Step S106).

When the speaker unit 10B is connected (Yes in Step S104), the control unit 106*a* controls the mute unit 106*b* to output (demute) the audio signal (Step S107). In addition, the control unit 106*a* turns on (debypasses) the filter function of the LPF 106*f* to pass only a bass component of the audio signal input from the audio signal processing unit 106*d* (Step S108).

The display unit 10C and the speaker unit 10B or external speakers output video and audio in accordance with the input video and audio signals (Step S109). Incidentally, although the aforementioned description has been made in the case where a channel is selected from a broadcast signal, processing will start at Step S104 when contents etc. reproduced by the storage/reproducing device 21 are viewed.

Figure 6A:
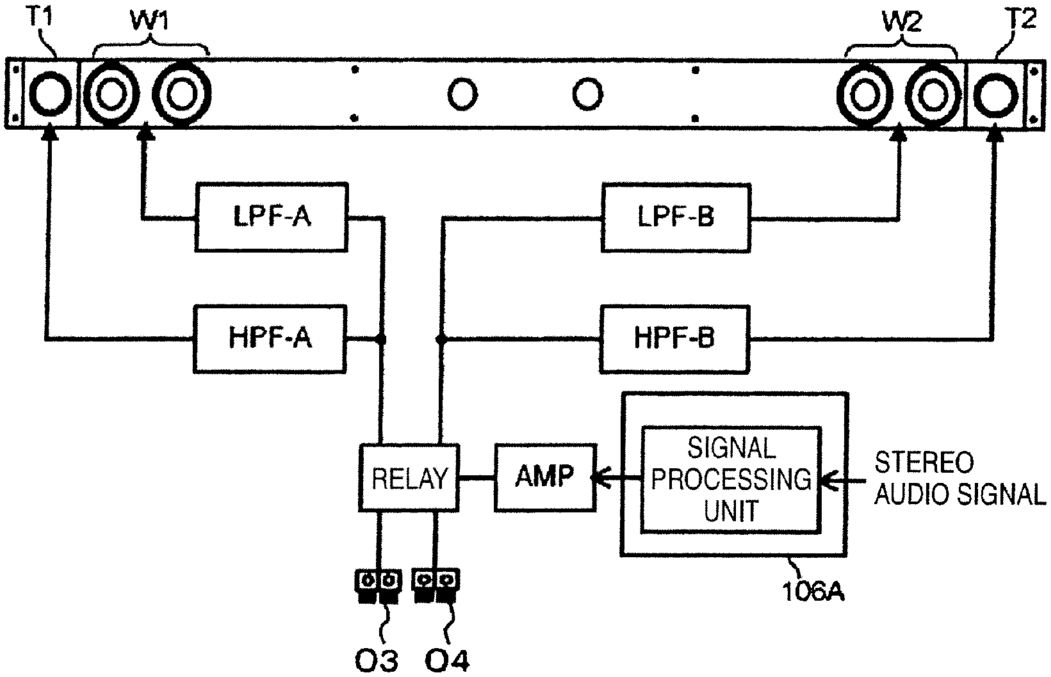
FIG. 6A is an exemplary diagram showing the configuration of an audio signal processing system according to a comparative example.
Figure 6B:
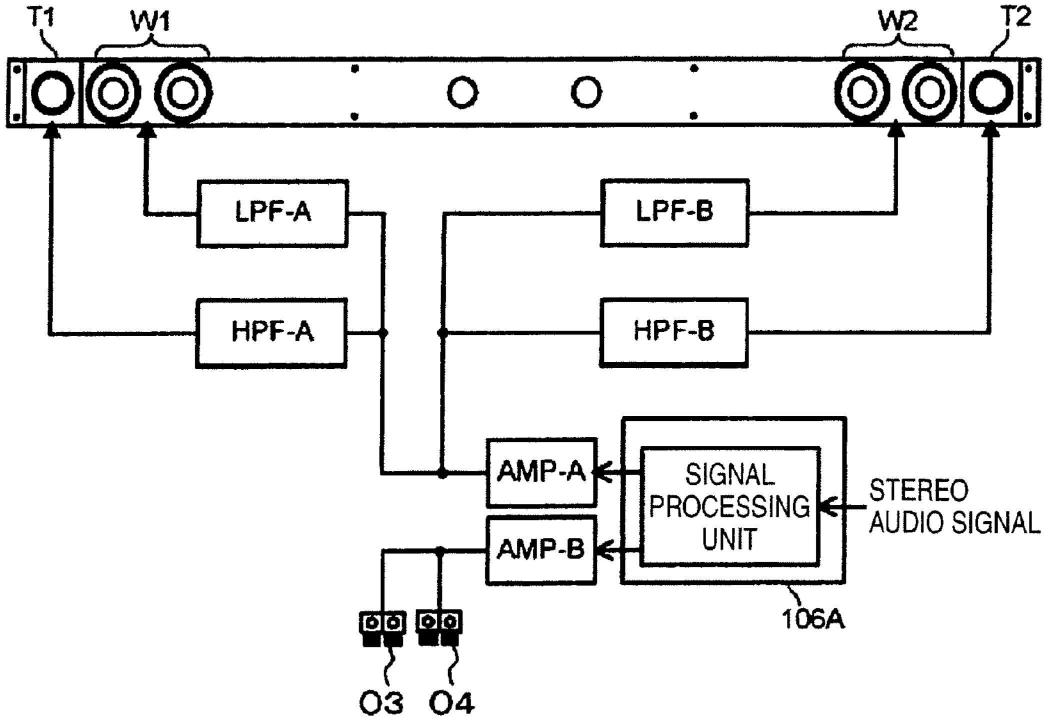
FIG. 6B is an exemplary diagram showing the configuration of an audio signal processing system according to another comparative example.

FIGS. 6A and 6B are exemplary diagrams showing configurations of audio signal processing systems according to comparative examples. As shown in FIG. 6A, in a comparative example, an audio signal to be input to speakers (tweeters T1 and T2 and woofers W1 and W2 in FIG. 6A) is amplified by one common amplifier AMP. The audio signal amplified by the amplifier AMP is branched in accordance with the speakers through a relay. The branched audio signals are input to the tweeters T1 and T2 and the woofers W1 and W2 through high pass filters HPF-A and HPF-B and low pass filters LPF-A and LPF-B, respectively.

Since the audio signal is output through the relay, the speakers can be changed over to external speaker terminals O3 and O4, and vice versa. The relay however needs to have a sufficient performance to satisfy an output current of the AMP. As shown in FIG. 6B, an AMP-A used for inputting a signal to respective speakers (tweeters T1 and T2 and woofers W1 and W2 in FIG. 6B) and an AMP-B used for external speaker terminals O3 and O4 are provided separately. In this case, the signal processing unit needs to change one of the operations of the two amplifiers AMP-A and AMP-B over to the other.

Each of the high pass filters HPF-A and HPF-B and the low pass filters LPF-A and LPF-B is an analog filter composed of a combination of a coil L and a capacitor C. Each of the high pass filters HPF-A and HPF-B separates and passes a treble component of an input audio signal. Each of the low pass filters LPF-A and LPF-B separates and passes a bass component of the input audio signal.

That is, in each comparison example, output of each amplifier AMP is separated into bands in accordance with the speakers by an LC network (the LPF-A, the LPF-B, the HPF-A and the HPF-B in FIGS. 6A and 6B) composed of combinations of coils L and capacitors C disposed in the inside or vicinity of the speakers. Specifically, the audio signal is separated into a treble (high frequency) audio signal and a bass (low frequency) audio signal by the LC network, so that the treble audio signal separated from the audio signal is input to the tweeters T1 and T2 while the bass audio signal is input to the woofers W1 and W2.

A phase disturbance caused by the capacitor C or the coil L, however, occurs in the vicinity of a cutoff frequency range (an edge of the band separated by the network) when an audio single is separated into a treble band or a bass band by a high pass filter or a low pass filter. As a method of reducing the phase disturbance, there is a multi-amplifier method in which an audio signal is amplified by amplifiers provided individually in accordance with the speakers. However, even when the multi-amplifier method is used, rounding occurs in transient characteristic (rising edge characteristic) of a composite waveform if Linkwitz-Riley type filters represented by Finite Impulse Response (FIR) filters are applied to separation of an audio signal.

Figure 7A:
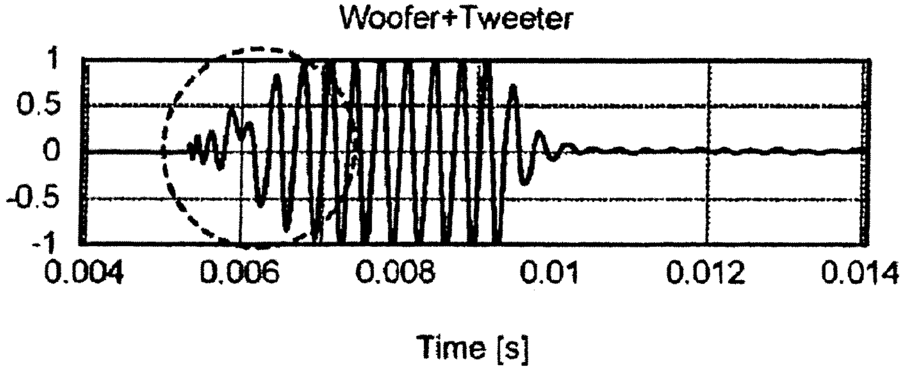
FIG. 7A is an exemplary graph showing transient characteristic according to each of the comparative examples.
Figure 7B:
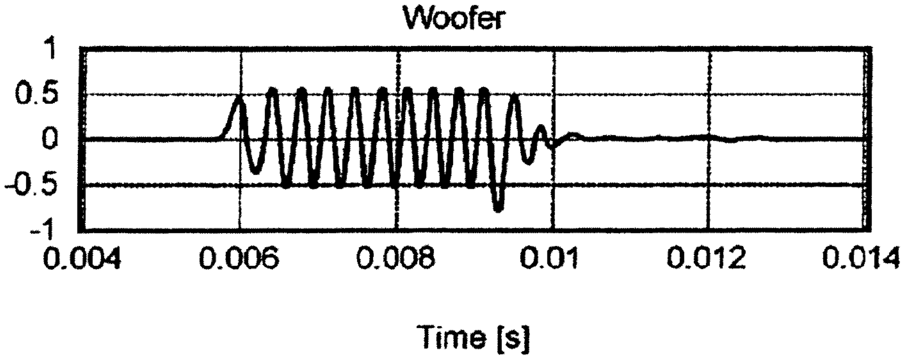
FIG. 7B is an exemplary graph showing transient characteristic according to each of the comparative examples.
Figure 7C:
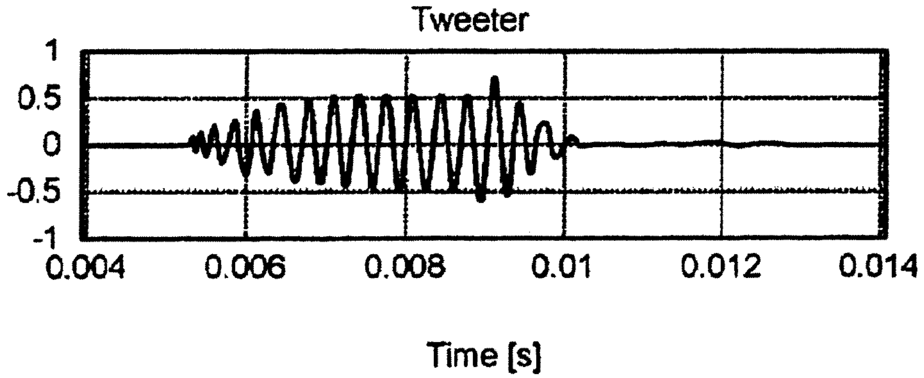
FIG. 7C is an exemplary graph showing transient characteristic according to each of the comparative examples.

FIGS. 7A to 7C are exemplary graphs showing transient characteristic in the case where the Linkwitz-Riley type filters are used. FIG. 7A is an exemplary graph showing a woofer-tweeter composite waveform. FIG. 7B is an exemplary graph showing a woofer waveform. FIG. 7C is an exemplary graph showing a tweeter waveform. When the Linkwitz-Riley type filters are used, rounding occurs in the rising edges of both the woofer waveform and the tweeter waveform as shown in FIGS. 7B and 7C. For this reason, as shown in FIG. 7A, rounding occurs in the rinsing edge (a portion encircled by the broken line) also in the woofer-tweeter composite waveform.

On the other hand, linear-phase filters are used as the HPFs and the LPFs in the audio output device 10 according to the first embodiment. Accordingly, it is possible to suppress effectively occurrence of rounding in the transient characteristic (rinsing-edge characteristic) of the composite waveform.

Figure 8A:
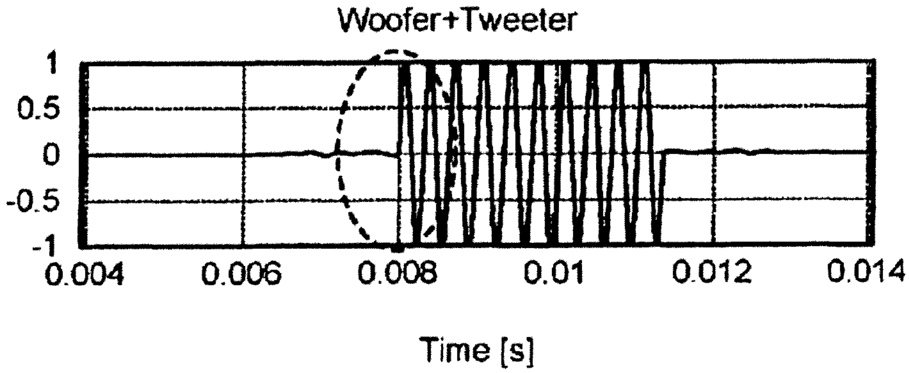
FIG. 8A is an exemplary graph showing transient characteristic according to the first embodiment.
Figure 8B:
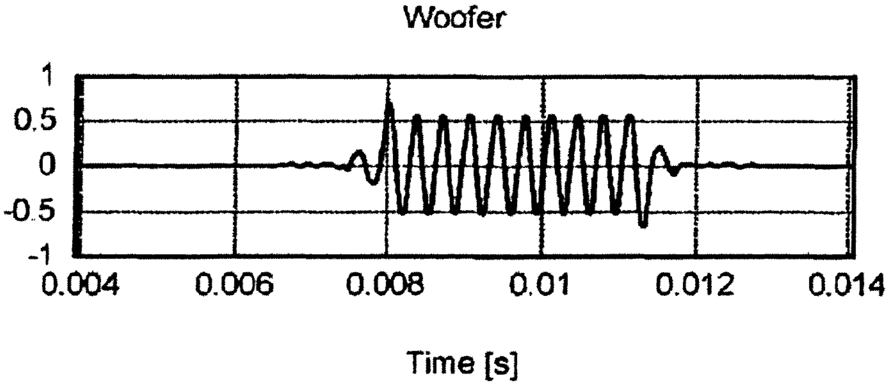
FIG. 8B is an exemplary graph showing transient characteristic according to the first embodiment.
Figure 8C:
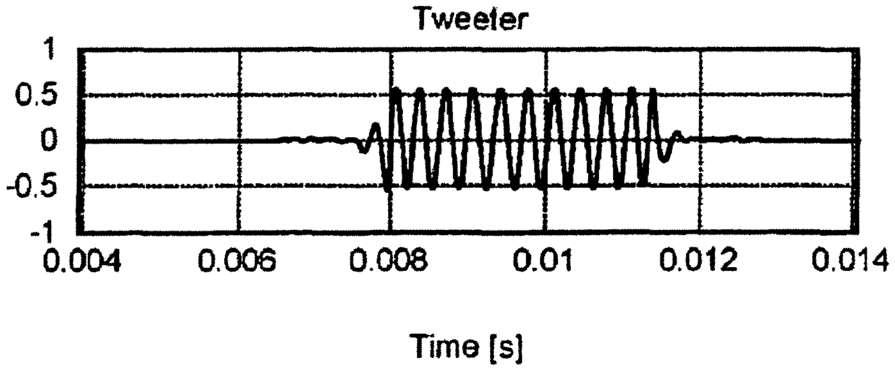
FIG. 8C is an exemplary graph showing transient characteristic according to the first embodiment.

FIGS. 8A to 8C are exemplary graphs showing transient characteristic in the case where the linear-phase filters are used. FIG. 8A is an exemplary graph showing a woofer-tweeter composite waveform. FIG. 8B is an exemplary graph showing a woofer waveform. FIG. 8C is an exemplary graph showing a tweeter waveform. As shown in FIGS. 8B and 8C, it is possible to suppress effectively occurrence of rounding in the rinsing edges of both the woofer waveform and the tweeter waveform. For this reason, as shown in FIG. 8A, it is possible to suppress effectively occurrence of rounding also in the rising edge (a portion encircled by the broken line) of the woofer-tweeter composite waveform.

Incidentally, it was necessary to increase the number of FIR taps in order to obtain sufficient cutoff characteristic (attenuation characteristic). It is however possible to construct an FIR filter having an enough number of taps to achieve sufficient cutoff characteristic (attenuation characteristic) because performance of a digital device such as a DSP for audio has been improved recently. Accordingly, the linear-phase filter can be used as a channel divider.

As described above, in the audio output device 10 according to the first embodiment, an audio signal is separated into two signal components by the rear stage of the AMP 107*b* of the amplification unit 107 so that one signal component is input to the woofers W1 and W2 while the other signal component is input to the terminals O1 and O2. For this reason, it is unnecessary to provide any additional amplifier for external speakers. Moreover, when connection of the speaker unit 10B is detected, the mute unit 106*b* is controlled to mute the audio signal component to be input to the tweeters T1 and T2 while the filtering process in the LPF 106*f* is bypassed. As a result, audio not passing through the filters is output from external speakers connected to the terminals O1 and O2, so that the performance (characteristic) of the external speakers can be utilized.

Further, in the condition that the speaker unit 10B is connected to the STB 10A, it is impossible to connect external speakers because the terminals O1 and O2 are covered with the connection member 10D. In addition, in the condition that the speaker unit 10B is not connected to the STB 10A, it is possible to connect external speakers because the terminals O1 and O2 are exposed. Accordingly, connection of the speaker unit 10B and connection of external speakers cannot be made simultaneously, so that the load imposed on the AMP 107*b* can be reduced effectively (e.g. a drive load of the AMP 107*b* can reduced).

Further, in the first embodiment, the audio signal processing unit 106 is composed of a DSP in which linear-phase filters are used as the high pass filter HPF 106*e* and the low pass filter LPF 106*f*. Accordingly, it is possible to suppress effectively occurrence of rounding in the transient characteristic (rising-edge characteristic) of the composite waveform. Although the LC network forming analog filters is limited to −18 dB/oct at maximum, cutoff characteristic can be set precipitously as described with reference to FIGS. 7A to 8C when the filters of the audio signal processing unit 106 according to the first embodiment are used.

For this reason, it is possible to reduce mutual interference in the vicinity of cutoff frequencies of the respective speakers. Particularly, in the tweeters which may be damaged when a bass audio signal is input to the tweeters, the allowed audio band can be widened (the cutoff frequency can be set to be low) because cutoff characteristic of the audio signal can be secured sufficiently. In addition, undulation of the phase (rotation of the phase) generally increases in the vicinity of cutoff frequencies when the cutoff characteristic (attenuation characteristic) is increased. For this reason, there is a tendency that connection between sounds of the respective speakers is worsened in the vicinity of cutoff frequencies. In the first embodiment, it is however possible to suppress sudden rotation of the phase (change of the phase) in the vicinity of cutoff frequencies because the linear-phase filters are used. Accordingly, it is possible to improve effectively connection of sounds between the respective speakers.

The invention is not limited to the embodiment per se and constituent elements can be modified and put into practice without departing from the gist of the invention in a practical stage. Although the first embodiment has been described on an example of configuration in which the AMP 107*b* for amplifying an audio signal to be input to the woofers W1 and W2 is used in common with external speakers, the AMP 107*a* for amplifying an audio signal to be input to the tweeters T1 and T2 may be used in common with external speakers. In this case, the mute unit 106*b* is disposed in the audio signal input system for inputting an audio signal to the woofers W1 and W2. The control unit 106*a* controls the mute unit 106*b* and the HPF 106*e* in accordance with whether the speaker unit 10B is connected or not. Since a control method has been described with reference to FIG. 4, duplicate description thereof will be omitted here.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the devices and systems described herein may be made without departing from the spirit of the inventions. The accompanying claims and their equivalents are intended to cover such forms or modifications as would fall within the scope and spirit of the inventions.

What is claimed is:

1. An audio output device comprising:

a main unit including a terminal configured to connect an external speaker;

a speaker unit being a component different than the external speaker, the speaker unit being configured to be detachably attached to a part different from the terminal of the main unit while the terminal is covered with the speaker unit to prevent contact between the terminal and the external speaker; and an amplification unit configured to amplify an audio signal so that the amplified audio signal is input to the terminal and the speaker unit.

2. The audio output device according to claim 1, wherein:

the speaker unit includes a bass speaker and a treble speaker;

the amplification unit includes a first amplifier configured to amplify the audio signal to be input to the bass speaker and a second amplifier configured to amplify the audio signal to be input to the treble speaker; and the terminal is provided in a rear stage of the first or second amplifier.

3. The audio output device according to claim 2 further comprising an audio signal processing unit including:

a first filter adapted to pass a bass component of an audio signal to be input to the first amplifier;

a second filter adapted to pass a treble component of the audio signal to be input to the second amplifier; and a control unit configured to turn off one of the first and second filters in accordance with a connection state of the speaker unit.

4. The audio output device according to claim 3 further comprising a setting unit configured to set the connection state of the speaker unit, wherein the control unit turns off one of the first and second filters based on setting of the setting unit.

5. The audio output device according to claim 3 further comprising a detection unit configured to detect the connection state of the external speaker, wherein the control unit turns off one of the first and second filters based on a detection signal of the detection unit.

6. The audio output device according to claim 1, wherein the speaker unit includes a connection member, configured to be detachably attached to the main unit while the terminals are covered with the connection member.

7. The audio output device according to claim 1, wherein the terminal is a dedicated connector for the external speaker.

* * * * *